United States Patent [19]
Fornoff

[11] 3,793,806
[45] Feb. 26, 1974

[54] LOW TEMPERATURE REMOVAL OF MERCURY FROM GAS STREAMS

[75] Inventor: Louis Leonard Fornoff, Cedar Grove, N.J.

[73] Assignee: Union Carbide Corporation, New York, N.Y.

[22] Filed: Sept. 25, 1972

[21] Appl. No.: 292,144

[52] U.S. Cl............................ 55/72, 55/82, 62/12, 75/121, 423/210
[51] Int. Cl............................................ B01d 5/00
[58] Field of Search. 55/80, 82, 72; 423/210; 62/12; 75/121

[56] References Cited
OTHER PUBLICATIONS

Technology Newsletter in Chemical Week dated 12/9/70 p. 50.

Primary Examiner—Bernard Nozick
Attorney, Agent, or Firm—Richard G. Miller

[57] ABSTRACT

The partial pressure of mercury as vapor in a gas stream is lowered to a maximum of less than 40 parts per billion by volume of mercury in a gas at one atmosphere and the product gas is substantially free of condensed mercury as mist by cooling a mercury-containing flowing gas stream to 0°F or below, providing that the gas stream also contains water vapor at a minimum partial pressure of $6 \times 10^{-3}$ atmosphere and the cooling is effected by indirect cooling means wherein condensed water is collected as crystalline ice.

1 Claim, 1 Drawing Figure

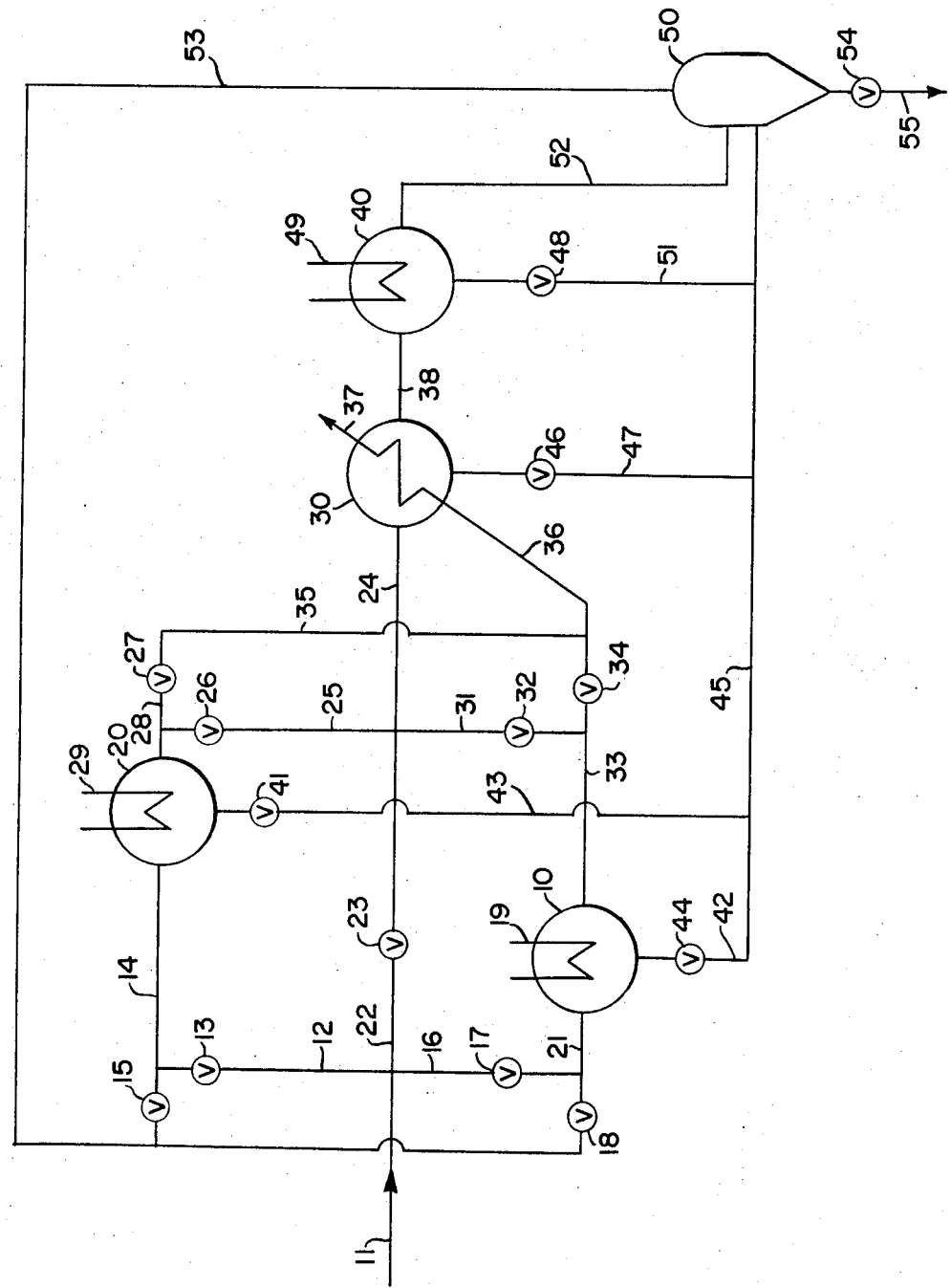

LOW TEMPERATURE REMOVAL OF MERCURY FROM GAS STREAMS

The present invention relates in general to the removal of mercury vapor from gas streams, and more particularly to a process for removing mercury vapor from gas streams which also contain water vapor by cooling said gas stream to 0°F or below.

In the commercial production of chlorine by the electrolysis of sodium chloride in which a metallic mercury containing electrode is employed, the electrolyzed sodium forms an amalgam with the mercury. Hydrolysis of the amalgam yields caustic soda, mercury and by-product hydrogen. The hydrogen is contaminated with the mercury which must be removed before disposal of the hydrogen as fuel or for recovery for other uses to prevent environmental pollution by mercury which, in one or more forms, is poisonous to virtually all living organisms. The hydrogen leaving the hydrolyzer is also saturated with wapter vapor which need not be removed for most end uses of the hydrogen, but has been a complicating and costly factor in many process heretofore proposed for mercury removal to the low concentrations now required. The common commercial adsorbents, including those of the molecular sieve type, must be employed in prohibitively large adsorption beds to have sufficient capacity to adsorb the water and still have sufficient capacity to adsorb the mercury. Activated carbon adsorption beds, while suitable for adsorbing mercury vapor from relatively dry gas streams, are found not to be suitable when the mercury-containing gas stream contacting the bed has a relative humidity of more than about 50 percent. It has also heretofore been proposed to refrigerate wet mercury-containing gas streams to 5°C to condense a major proportion of the water and mercury vapor so that the size of adsorber beds used in subsequent treatment of the gas stream can be somewhat reduced. The combination of refrigeration and adsorption are in general found to be too costly to be commercially attractive. Cryogenic condensation techniques used alone have generally been unsuccessful because mercury has an extremely high surface tension which causes minute droplets to form and remain suspended in the gas as mist, even despite the use of conventional mist eliminators.

It is, accordingly, the general object of the present invention to provide a process for lowering the concentration of mercury in gas streams to levels at which the gas streams can be safely vented to the atmosphere and for recovering the mercury in a readily useable form.

It has now been found that mercury can be removed from a gas stream by a cryogenic process in which the gas is cooled to a temperature at which the concentration of mercury in its vapor state in the gas stream is at its desired low concentration provided that the gas stream also contains a substance in its vapor state which freezes out as a crystalline solid at the selected temperature of the cryogenic process. In accordance with the present invention there is provided a process which comprises (a) providing a hydrogen gas stream containing at least $2.6 \times 10^{-7}$ atmosphere mercury vapor and at least $6 \times 10^{-3}$ atmosphere water vapor, (b) passing said gas stream into a chamber containing a surface in contact with said gas stream maintained at a temperature not greater than 0°F, (c) cooling said gas stream in said chamber sufficient to form crystalline ice from water vapor in said gas stream whereby mercury is occluded in said crystalline ice, (d) retaining the crystalline ice and occluded mercury in said chamber while passing the mercury depleted gas stream therefrom and (e) melting the ice and occluded mercury mass from said chamber and recovering the liquid mercury.

The saturation vapor pressure of mercury at various temperatures is known and accurate values are readily available in the literature. Vacuum technology has made use of this data in the protection of vacuum systems employing mercury vapor diffusion pumps by interposing a cryogenic trap between the pump and that part of the system being evacuated to block the back diffusion of mercury from the pumping system into the pumped system. Such a technique is effective whether or not the cryogenically condensed mercury collects as a solid on the surface of the cryogenic trap or suspends as a mist in the gas because the net mass flow of gas in such systems is from the pumped system toward the pump so there is no tendency for mercury mist to be carried into the pumped system. An opposite situation exists when it is attempted to cryogenically remove elemental mercury from a flowing gas stream to produce an effluent gas of substantially lowered content of elemental mercury. In that case the mercury present in excess of vapor saturation at the prevailing temperature and pressure conditions condenses from vapor to the liquid or solid state, but due to its high surface tension in the liquid state a portion of the condensate ends up as a fine mist which remains suspended in the flowing gas. The instant discovery does not in any way change the physical law of the dependence of mercury vapor pressure on temperature but in fact uses this dependence to meet a desired specification for the concentration of mercury vapor remaining in the purified gas stream.

The following examples illustrate the invention by means of a preferred process embodiment of particular industrial importance.

EXAMPLE I a. With reference to FIG. 1, hydrogen gas at 100 F and 21.7 psia containing 10.0 ppm volume of mercury and saturation water vapor enters feed inlet conduit 11, passes through conduit 12 and valve 13 to conduit 14 through which the gas enters cryogenic chamber 20, which contains a refrigeration coil 29 and an agglomerate mass of ice and occluded mercury droplets deposited therein during the previous cycle of the process. Over the period during which the gas stream is fed to cryogenic chamber 20 the refrigeration coil is not in operation and the ice mass is being melted. Water and liquid mercury produced by the melting operation are withdrawn from cryogenic chamber 20 through valve 41, conduits 43 and 45 to a water and liquid mercury collector 50. Removal of collected water and mercury from the system is accomplished via valve 54 and line 55. The mercury and water laden hydrogen gas stream effluent from cryogenic chamber 20 passes through conduit 28, valve 26, conduits 25 and 24 to refrigeration economizer 30. Therein it is in indirect heat exchange with cold hydrogen entering through conduit 36 and exiting through conduit 37. The water and mercury laden hydrogen in passing through economizer 30 is cooled to 80°F, causing a partial dropout of the water. From economizer 30 the hydrogen flows through conduit 38 to cooler 40 where its temperature is lowered to about 40°F by heat exchange with cold water in coil 49. The hydrogen stream now passes through conduit 52 into collector 50 where liquid water and mercury, having condensed as the temperature of the hydrogen was successively lowered, are dropped out for removal from the system through valve 54 and line 55. The condensed water and mercury collected in 50 includes the liquid drainage from cryogenic vessels 10 and 20, economizer 30 and cooler 40 which flows from these through valve 44, 41, 46, and 48, all of which are in communication with collector 50 by means of drain manifold 45 with connecting conduits 42 and 43, 47 and 51 serving valves 44, 41, 46 and 48, respectively. The hydrogen gas passes from collector 50 through conduit 53, valve 18, conduit 21 to cryogenic chamber 10 wherein its temperature is lowered to 0° F by heat exchange with refrigerant in coil 19, causing freeze-out of additional water from the hydrogen which is collected as ice on the refrigerated surfaces. The rapid condensation and ice crystallization nucleates the formation of mercury droplets which become trapped in the ice deposit. The hydrogen gas exiting chamber 10 at 0°F is virtually free of entrained mist of either condensed water or mercury and has been purified of mercury to a level of less than 40 ppb (v). The 0°F hydrogen passes through conduit 33, valve 34, and conduit 36 to pass through the economizer indirectly transferring heat from the process hydrogen as explained hereinbefore and exits as purified product hydrogen through conduit 37. Periodically the flow positions of cryogenic chamber 10 and 20 are interchanged so that while one is in the ice and mercury condensing service the other is being thawed. In effecting this interchange several steps are involved so that at least one of the cryogenic chambers is operating in the water and mercury freeze-out position at all times. In this example, chamber 10 is in the ice and mercury condensing step and chamber 20 is in the thaw step. It is desired to remove chamber 20 from its thaw step and lower its temperature with refrigerant in coil 29 before interchanging it with chamber 10. This is feasibly done by opening valve 23, allowing the feed hydrogen gas entering line 11 to pass into conduit 22 through valve 23 and conduit 24 to economizer 30 and by closing valves 13 and 26 and opening valve 27. Thus there is communication of chamber 20 with hydrogen product in conduit 36 by means of conduit 35 between valve 27 and conduit 36 but there is no positive flow of gas through chamber 20 with this arrangement, thus permitting cool-down under stagnation conditions. Then cryogenic chamber 20 can be placed in the processing step of freeze-out of water and mercury by opening valve 15 and closing valve 18. Now by closing valve 34, opening valves 17 and 32, and clsoing valve 23, chamber 10 is placed in the thaw step. It should be understood that refrigerant flow in coil 19 is discontinued during the thaw step.

b. To demonstrate the effectiveness of the procedure of part (a) supra, the same process was repeated except that the feed stream of hydrogen contained only mercury and was essentially water-free. While all other conditions were held constant, it was observed that the hydrogen effluent from the system through conduit 37 contained about 130 ppb (v) of total mercury. This much higher mercury concentration was clearly due to entrained mercury mist, which during the process of part (a) supra had been occluded by ice and thus effectively removed from the gas stream.

It will be readily apparent to those skilled in the art that in view of the foregoing disclosure, numerous modifications are readily conceivable without departing from the proper scope of the present invention. For example, the process can albeit less economically, be run continuously using only one refrigerated chamber in which the ice-mercury agglomerate extracted from the gas stream is removed mechanically from the cryogenic surfaces rather than by melting, as illustrated hereinabove. Also, pre-cooled particles can be utilized in the manner of a fluidized bed to contact the gas stream as serve as the cryogenic surface. Moreover, although the present disclosure has specified water vapor as the constituent which upon freezing occludes mercury, it will be evident that other materials of similar physical properties can be substituted in part or entirely for the water vapor in the gas stream.

What is claimed is:

1. Process for removing mercury from hydrogen gas streams which comprises (a) providing a hydrogen gas stream containing at least $2.6 \times 10^{-7}$ atmosphere mercury vapor and at least $6 \times 10^{-3}$ atmosphere water vapor, (b) passing said gas stream into a chamber containing a surface in contact with said gas stream maintained at a temperature not greater than 0°F, (c) cooling said gas stream in said chamber sufficient to form crystalline ice from water vapor in said gas stream whereby mercury is occluded in said crystalline ice, (d) retaining the crystalline ice and occluded mercury in said chamber while passing the mercury depleted gas stream therefrom and (e) melting the ice and occluded mercury mass from said chamber and recovering the liquid mercury.

* * * * *